United States Patent Office 3,313,212
Patented Apr. 11, 1967

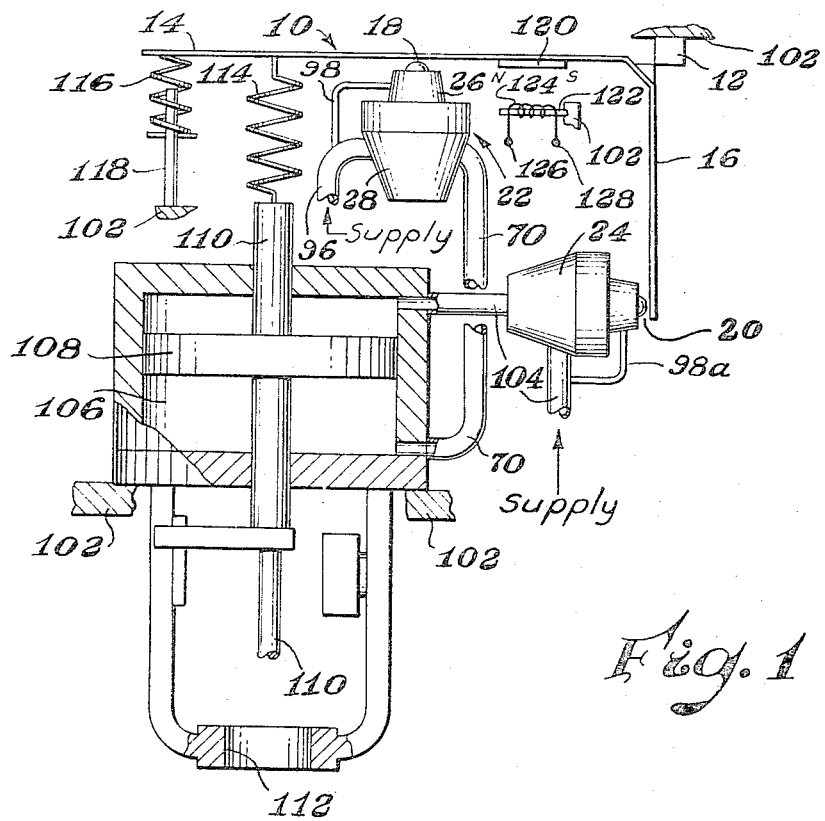
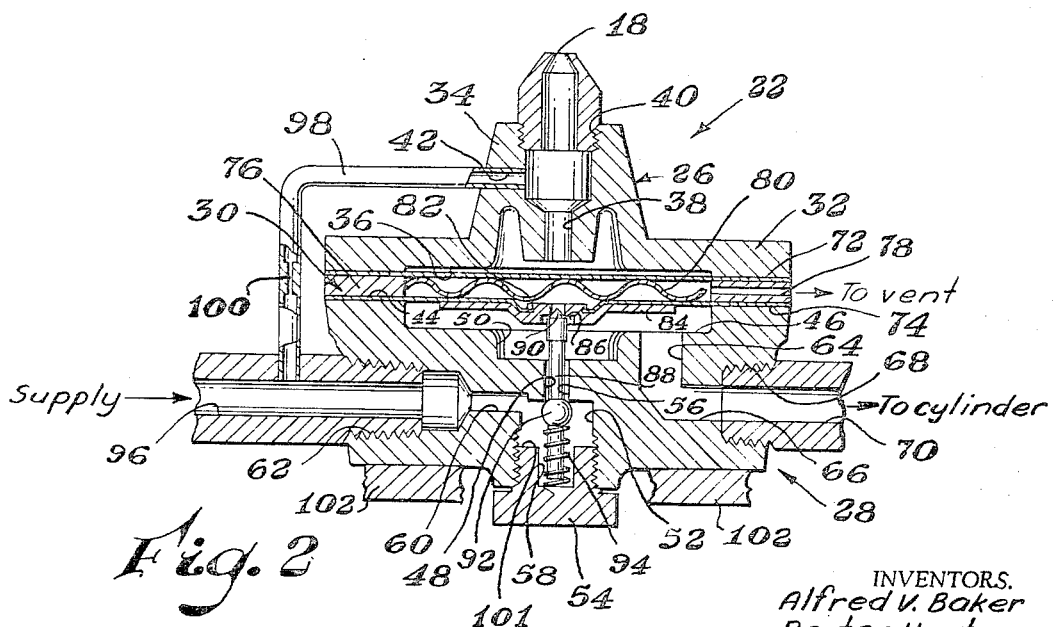

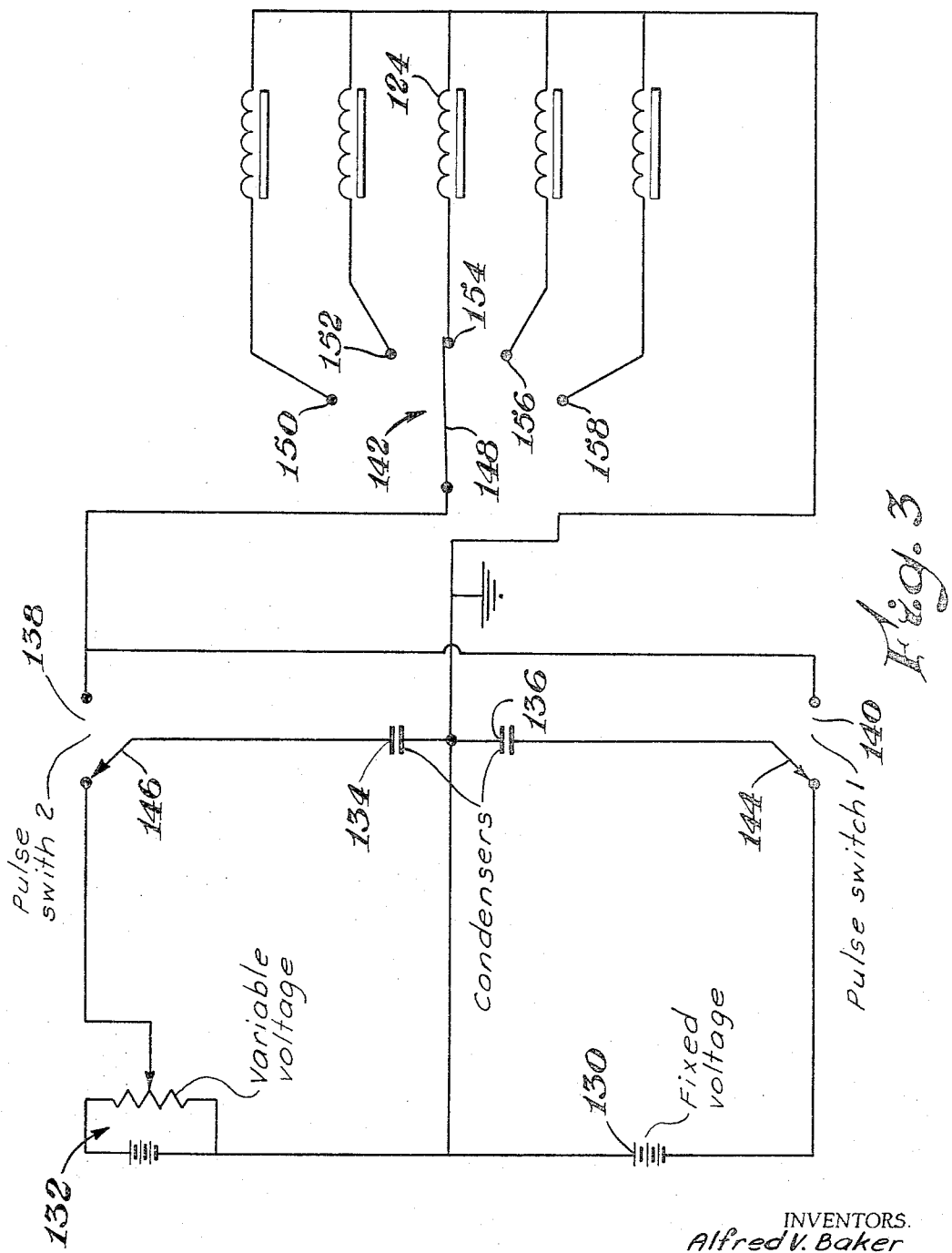

3,313,212
MAGNETIC-PNEUMATIC CONTROL SYSTEM
Alfred V. Baker, Freeport, and Porter Hart, Lake Jackson, Tex., assignors to The Dow Chemical Company, Midland, Mich., a corporation of Delaware
Filed June 1, 1964, Ser. No. 371,631
6 Claims. (Cl. 91—387)

This invention relates to apparatus for actuating process control or other elements by means of intermittent signals in accordance with a desired predetermined functional relationship.

A number of approaches have been made towards controlling chemical or other manufacturing processes from a single centralized or remote location with respect to valves or other elements being controlled.

Pneumatic control exercised from a central location is one approach.

In another approach a continuous electrical signal is passed through a coil coupled to a soft iron magnetizable element to provide a magnetic field of predetermined strength which is then coupled directly to a controlled element or indirectly to the control element through a pneumatic controller device.

So far as is known, the prior art systems or methods for actuating process control elements in accordance with a predetermined functional relationship suffer from one or more of the following problems:

(a) The speed at which actuating control is asserted or changed is too slow either for the process being controlled or for efficient and/or effective coupling to the means for determining the desired predetermined functional relationship;
(b) The apparatus is unduly complex with respect to the work the apparatus accomplishes;
(c) The apparatus is rather expensive with respect to the work being accomplished;
(d) The reliability of the apparatus is not as good as could be desired, resulting in substantially less than optimum process control;
(e) The stability of the control system, e.g. wherein the day to day application of the same control signal results in the same degree of valve control, for example, may be less than is desired;
(f) In event the control apparatus becomes inoperative, the degree of safety in further operation or shut down of the process being controlled is less than can be tolerated;
(g) The apparatus controls the process in discrete changes in adjustment of process equipment which are larger than can be conveniently used;
(h) Each element controlled requires for its control a continuous sampling signal from the computer or other device which calculates the degree of control required, or
(i) The control system isn't compatible for use with existing actuating devices.

Accordingly, a principal object of this invention is to provide improved apparatus for actuating process control or other elements.

Another object of this invention is to provide an improved, more economical apparatus for actuating process control or other elements.

A further object of this invention is to provide an improved, more reliable apparatus for actuating process control or other elements on a continuous basis from control signals applied on a discontinuous basis.

An additional object of this invention is to provide an improved apparatus for actuating control or other elements with a great degree of resolution.

In accordance with this invention there is provided valve or control element positioning apparatus comprising a pair of pneumatic relays which are coupled to a common balance beam which has a permanent magnet whose degree of magnetism is settable to pre-determined levels on suitable pulsing of an electromagnetic winding which is coupled to the permanent magnet. The output of each relay is coupled to a pneumatic cylinder, one output above and one output below the piston in the cylinder.

As the balance beam moves in one direction, the pneumatic output of one relay increases and the pneumatic output of the other relay decreases, moving the piston. A range spring coupled between the piston and the balance beam transmits a position restoring or beam balancing force to the beam.

The invention, as well as additional objects and advantages thereof, will best be understood when the following detailed description is read in connection with the accompanying drawings, in which:

FIGURE 1 is a diagrammatical view of control element positioning apparatus in accordance with this invention;

FIGURE 2 is a side elevational view, in section, of a relay of the type shown in FIGURE 1, and FIGURE 3 is a schematic diagram of a simplified pulsing circuit for use in pulsing the electromagnetic element in FIGURE 1.

Referring to the drawing, there is shown control element positioning apparatus comprising a balance beam 10 which is coupled to a pivot element 12 at least approximately near the junction of the transversely disposed arms 14, 16 of the balance beam 10. The two arms 14, 16 are disposed at right angles to one another in order to permit the apparatus to be compact, but a straight balance beam may be used.

The relays 22, 24 (relay 22 being shown in detail in FIGURE 2), are substantially identical in structure. The relay 22 comprises an upper section, indicated generally by the numeral 26, and a lower section, indicated generally by the numeral 28.

A combination diaphragm-vent assembly 30 is sandwiched between the two sections 26, 28.

The upper section 26 comprises a flanged peripheral part 32 and a central generally frusto-conical part 34 having its base joined to the peripheral flanged part 32. The part of the section 26 which faces the diaphragm-vent section 30 has a slight counter-bore 36 therein whereby the central part of the section 26 is spaced from the diaphragm-vent section 30.

A longitudinal bore 38 extends from the upper to base end of the frusto-conical part 34. The upper end 40 of the bore 38 is threaded and receives a nozzle 18. A lateral bore 42 extends through the side wall of the frusto-conical part 34 and communicates with the bore 38.

The lower section 28 has a generally frusto-conically shaped outer configuration with its base 44 facing the diaphragm-vent section 30. The base 44 has a large diameter counter-bore 46 (approximately the same diameter as the diameter of the counter-bore 36). A central bore 48 extends axially through the section 28 from end to end. The bore 48 has a counter-bore 50 at its base end and a counter-bore 52 at its other end. The counter-bore 52 is threaded and receives a plug 54 whose end 101 has a bore 58 therein.

A valve seat 56 is disposed at the junction of the bore 48 and counter-bore 52.

A bore 60 having a threaded counter-bore 62 extends from the side wall of the section 28 to the counter-bore 52.

A bore 64 extends downwardly from the counter-bore 46 and communicates with a bore 66 which extends inwardly from the side wall of the section 28. The outer end 68 of the bore 66 is counter-bored and threaded to receive a tube 70.

The diaphragm-vent section 30 comprises a pair of thin diaphragm discs 72, 74 having substantially the same diameter as the bases of sections 26, 28. The discs 72, 74 are separated at their peripheral parts by an annular gasket member 76 which is generally not compressed during its usage in this device. A bore 78 extends laterally through the annular gasket member 76 and constitutes a vent.

The space between the diaphragm discs 72, 74 which is surrounded by the peripheral gasket member 76 has a generally corrugated material 80 therein, contacting both discs 72, 74.

The disc 74 has a central bore 82 extending therethrough. A stiffener element 84 is bonded to the disc 74 and has a valve seat 86 which communicates with the bore 82. The valve seat 86, valve seat 56 and bore 58 are axially aligned.

A valve stem 88 which has a valve 90 at one end and a second valve 92 intermediate its ends is disposed within the section 28 with its valve 90 seated against the valve seat 86, the valve 92 seated against the valve seat and its lower end disposed within the bore 58 of the plug 54. A spring 94 surrounds the lower end part of the valve stem 88, bearing against the plug 54 and valve 92 and urging the valve stem upwardly.

An air (gas) supply line 96 is coupled to the counter-bore 62. A second air supply line 98 extends between the line 96 and the bore 42. The line 98 has a constriction 100 therein.

The lower section 28 is mechanically coupled to a frame (shown only in part) 102.

Referring again to FIGURE 1, it may be seen that the gas supply lines 96, 104 are provided for the relays 22, 24 respectively. The output lines 70, 104 (with supplemental supply line 98a) for relays 22, 24, respectively are coupled to opposite ends of a pneumatic cylinder 106 which is mechanically coupled to the frame 102.

A piston 108, disposed within the cylinder 106 and is coupled to a shaft 110 which extends through the ends of the cylinder 106.

The shaft 110 is adapted to be coupled to a valve actuator arm (not shown), for example, which would normally be disposed below the yoke 112.

A spring 114 is coupled between the upper end of the shaft 110 and the arm 14 of the balance beam 10.

A bias spring 116 is also couped between the frame and the balance arm 14 by means of the rod 118.

A permanent magnet 120 is mechanically coupled to the arm 14 of the balance beam 10 near the pivot 12.

A second permanent magnet 122 having an electromagnetic coil 124 surrounding it is mechanically coupled to the frame 102 substantially parallel to the magnet 120 and close spaced with respect to the magnet 120 whereby their magnetic fields interact to a substantial degree.

The coil 124 is energized by applying current to it through the leads 126, 128. A suitable circuit for applying current to the coil 124 is shown in FIGURE 3.

The circuit of FIGURE 3 includes a source of fixed voltage 130, indicated as a battery, for example, a source of variable voltage 132, a pair of condensers 134, 136, a pair of single pole, double throw switches 138, 140, and a single pole, multiple throw switch 142.

The voltage source 130 has its positive terminal connected to a ground and its negative terminal connected to one throw of the single pole, double throw switch 140. The condenser 136 is connected between ground and the movable contact 144 of the switch 140.

The variable voltage source 132 has its negative terminal connected to ground and its positive terminal connected to one of the throws of the switch 138. The condenser 134 is connected between ground and the moving contact 146 of the switch 138. The second throw of each of the switches 138, 140 are connected together and to the movable contact 148 of the single pole multiple throw switch 142.

Each of the contacts or throws 150, 152, 154, 156, 158, for example, are connected to one end of a coil (such as the coil 124, for example) which is coupled to a permanent magnet (such as magnet 122, for example) of one of the magnetic-pneumatic transducer devices (10). The other end of each coil is connected to a common ground.

In operation, using the circuit of FIGURE 3, with the moving contact 148 of the switch 142 set to the throw 154, to which the coil 124 (see FIGURE 1 also) is coupled, the condenser 136 is charged by moving the contact 144 to couple the condenser 136 across the source of fixed voltage 130. The contact 144 is then connected to the other throw of the switch 140, discharging the condenser 136 across the switch 142, through the coil 124, to ground.

The variable voltage source 132 is then set to the potential which will induce the requisite degree of magnetization of the magnet 122 when the coil 124 is pulsed in the opposite direction. (The variable voltage source and the fixed voltage source are polarized opposite with respect to ground.)

With the contact 146 of the switch 138 coupled to the now pre-set variable voltage source 132, the condenser 134 is charged to the level set by the voltage source 132.

The contact 146 on switch 138 is then coupled to the other throw of that switch, discharging the condenser 134 through the switch 142 and coil 124 to ground (with the condenser 136 disconnected from the discharge circuit). This last pulse, oppositely polarized with respect to the pulse which occurred when the condenser 136 was discharged, produces a degree of magnetization in the magnet 122 which is proportional to the level, output or amount of control to be accomplished by the transducer device 10.

The magnet 122 may be magnetized with respect to the magnet 120 so that they repel each other, are neutral to each other, or attract each other; the resulting force exerted on the beam by the magnets 122, 120 being a function of the level and polarity of magnetization induced in the magnet 122 (assuming the magnetization of magnet 120 remains constant).

If the force caused by the interaction of the magnets 122, 120 is a repelling force, that force would tend to push the arm 14 of the balance beam in an upward direction, moving the beam away from the nozzle 18 of the relay 22.

As the balance beam arm 14 moves away from the nozzle 18, the beam arm 16 moves closer to the nozzle 20 of the relay 24.

In relay 22, the nozzle pressure drops as the beam arm 14 moves from the nozzle. Because the pressure on the lower side of the diaphragm assembly 30 exceeds the pressure on the upper side, the valve seat 86 and the diaphragm assembly moves upwardly from the valve 90, allowing pressure from the cylinder air line 70 to be vented until the pressure balances on each side of the diaphragm assembly.

In the relay 24, the increase in nozzle pressure as the beam arm 16 approaches the nozzle 20 causes an excess of pressure on the nozzle side of the diaphragm assembly 30. The greater pressure on the nozzle side forces the diaphragm assembly 30 and valve element 88 downward, opening the valve 92 and allowing air (or other gas) from the supply line 96 to pass through the bore 48 and out through the line 104 to the cylinder 106 until the pressure equalizes on both sides of the diaphragm assembly.

The decrease in pressure on the upper side of the piston 108 and the increase in pressure on the lower side of the piston 108 causes the piston to move upwardly in the cylinder 106. The shaft 110 bears against the spring 114, tending to compress it and thereby apply a restoring force to the balance beam arm 14.

The balance beam remains in the position it is in until a change in the magnetic field strength of one of the magnets 120, 122 occurs. Since the magnet 122 may have its coil 124 pulsed as heretofore described, the relays 22 24 operate as described above (or in reverse order in event the balance arm 14 is moved towards rather than away from the nozzle 18 by the change in magnetism of the magnet 122).

It may be seen from the above that the present invention provides an effective means whereby positional control of a process control element may be maintained at a pre-determined level in response to electrical impulses applied to the device. It should be realized that the pulsing of the coil 124 from the condenser charged with a fixed voltage is followed rapidly by the pulsing from the condenser which is charged by the variable voltage whose valve is a function of the positional control to be maintained by the device. Because of the rapidity at which the second pulse follows the first or reset pulse, the inertia of the device prevents any change in the positional stability when the reset pulse is applied.

The circuitry of FIGURE 3 is simplified in form, and in practice more sophisticated pulsing means would be provided. It may readily be seen, however, that as the contact 148 of the switch 142 is moved, other coils may be pulsed either in sequence or on a random basis.

What is claimed is:

1. Control element positioning apparatus comprising a balance beam, said balance beam being coupled to a pivot element, a pair of pneumatic force balance elements each having an air nozzle, the nozzle of each force balance element being disposed adjacent to said balance beam and positioned whereby movement of said beam towards one nozzle moves the beam away from the other nozzle, each of said force balance elements having a pneumatic output element, a pneumatic cylinder, said cylinder having a piston disposed therein, said piston being coupled to a shaft, each of said pneumatic output elements being coupled to an end of said cylinder, a first permanent magnetic element having a fixed degree of magnetism, a second permanent magnetic element, one of said magnetic elements being fixedly coupled to said balance beam and the other said magnetic element being disposed a fixed distance therefrom such that the magnetic fields of the two magnetic elements interact, said second permanent magnetic element having an electrical coil coupled thereto and means whereby said coil may be electrically pulsed at predetermined intervals to re-set the degree of magnetism of said permanent magnetic element to a predetermined value.

2. Apparatus in accordance with claim 1, wherein said balance beam has two arms disposed transversely with respect to one another, said pivot element being at the junction of said arms, and one of said force balance elements is operatively coupled to each arm of said balance beam, each balance element being coupled to the same side of said beam.

3. Apparatus in accordance with claim 1, wherein a range spring is coupled between said shaft and said balance beam.

4. Apparatus in accordance with claim 1, wherein said shaft is adapted to be coupled to a process control element.

5. Apparatus in accordance with claim 1, wherein said pivot, force balance elements, cylinder, and second permanent magnetic element are fixedly coupled to a common frame.

6. Apparatus in accordance with claim 1, wherein said means whereby said coil may be electrically pulsed includes means for sequentially pulsing said coil to induce a base level of magnetism in said second magnetic element and then rapidly pulsing said coil to induce a degree of magnetism in said second magnetic element which is a function of a predetermined level of control to be achieved.

References Cited by the Examiner
UNITED STATES PATENTS

| 2,443,891 | 6/1948 | Buerschaper | 91—47 |
| 2,827,020 | 3/1958 | Cook | 91—387 |
| 3,087,468 | 4/1963 | Roberts et al. | 91—387 |
| 3,222,996 | 12/1965 | Thieme et al. | 91—382 |

MARTIN P. SCHWADRON, *Primary Examiner.*

PAUL E. MASLOUSKY, *Examiner.*